(No Model.)

O. W. SLOCUM.
METHOD OF MAKING PRINTERS' CHASES.

No. 508,250. Patented Nov. 7, 1893.

Witnesses.
Louis R. Gowell.
Emma J. Bennett.

Inventor.
Orsittus W. Slocum
by Crosby & Gregory
Attys

UNITED STATES PATENT OFFICE.

ORSILLUS W. SLOCUM, OF TAUNTON, MASSACHUSETTS, ASSIGNOR OF SIX-SEVENTHS TO EDWARD McDONALD, A. J. McDONALD, EDWARD F. GOODWIN, JOHN H. GALLIGAN, SUMNER B. SARGENT, AND EDWARD L. SARGENT, OF SAME PLACE.

METHOD OF MAKING PRINTERS' CHASES.

SPECIFICATION forming part of Letters Patent No. 508,250, dated November 7, 1893.

Application filed December 19, 1892. Serial No. 455,599. (No model.)

*To all whom it may concern:*

Be it known that I, ORSILLUS W. SLOCUM, of Taunton, county of Bristol, State of Massachusetts, have invented an Improvement in Methods of Making Printers' Chases, of which the following description, in connection with the accompanying drawings, is a specification, like letters on the drawings representing like parts.

Printers' chases as now manufactured are made of cast or wrought iron. In the former instance, the casting is finished by special machinery to make the interior perfectly square and independently trued. In the latter instance, the chase is made by heating a bar and bending it to shape, and thereafter welding the two ends of the bar together each to each. The frames are then milled out by machinery to true the inner edges and square the corners.

Cast iron chases are cheaper to make, and do not require so much finishing, but they can only be made in the smaller sizes, as the strains to which the large sizes are subjected are too great to be withstood by cast iron.

In newspaper work, and in much book work very large chases are used, and to make them sufficiently strong they are made of wrought iron rods or bars, bent to shape as stated.

It is impossible to secure true inner edges in the vicinity of the chase corners, or to get square corners, without subsequent treatment by hand, which is slow and expensive, or by milling, which, though more rapid, is nearly as expensive, owing to the numerous adjustments of the cutters, made necessary by the nature of the work.

This invention has for its object the production of a printer's chase which shall possess the strength of a wrought iron chase, and which can be made in all sizes as cheaply as the inferior cast iron chases, and requiring no finishing after the welding operation.

In accordance therewith my invention consists in the method of making printers' chases, which comprises first truing the inner edge and top and bottom faces of a series of separate metallic strips or bars and squaring the ends thereof, assembling the said strips or bars with the squared end of one beveled at its upright corners and butted against the trued inner edge of and at right angles to the adjacent bar at or near its end, and thereafter welding the butted ends together, substantially as will be described.

Figure 1:
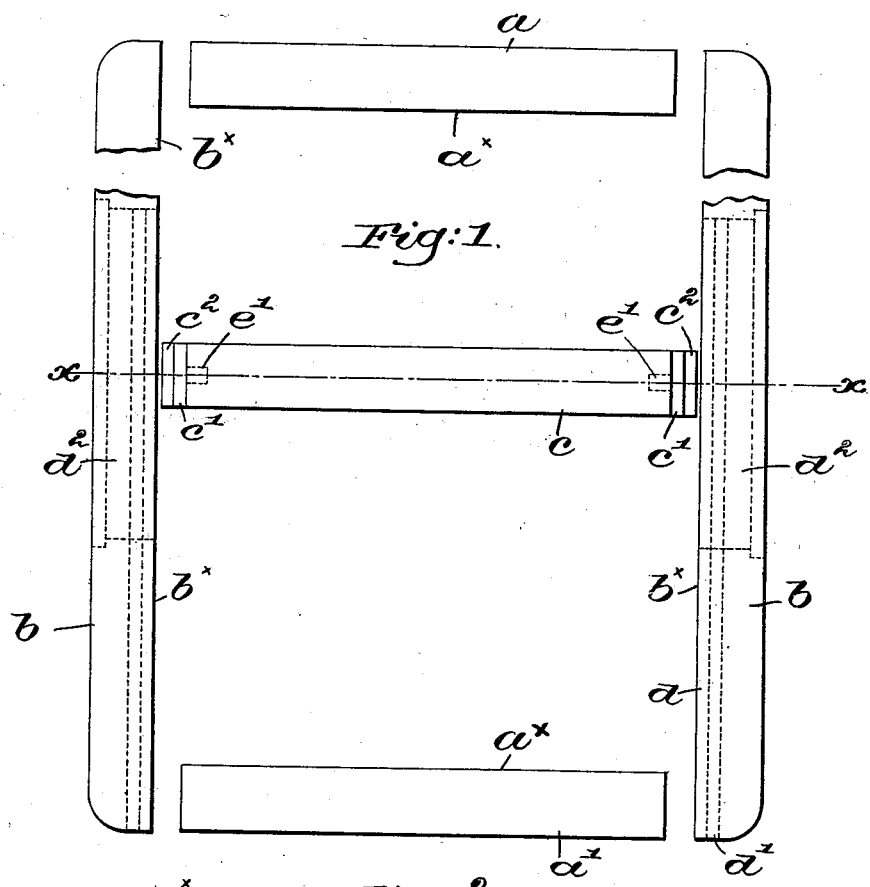
Figure 2:
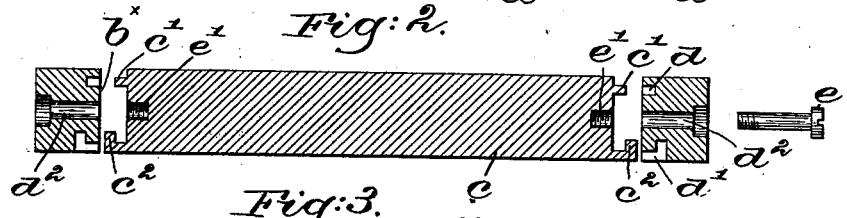

Figure 1, in plan view, partially broken out to save space, shows the separate pieces of a chase embodying my invention. Fig. 2 is a vertical section taken on the line $x$—$x$ Fig. 1; and Fig. 3 is a detail to be referred to.

The end pieces $a$, $a'$, and side pieces $b$, $b'$, preferably made of wrought iron strips or bars, are finished, by planing or milling, before they are assembled, to present perfectly true inner edges $a^\times$ and $b^\times$, and the top and bottom faces thereof are made parallel to each other at right angles to said inner edges, the side and end pieces being of equal thickness and squared at the ends. When so finished the inner edge of each piece is perfectly straight and true from end to end. The pieces are then assembled, the end of one piece being butted against the straight inner edge of another piece at right angles thereto, and the pieces are then welded together, preferably by the use of an electric current.

Figure 3:
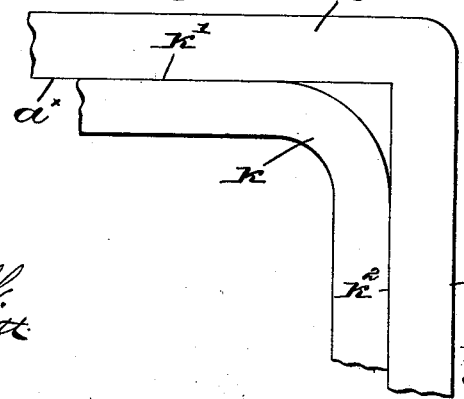

In order to make the corner perfectly square and true, the corners between the top and bottom faces of the end pieces are slightly beveled or nicked off, and the side and end pieces, as $a$ and $b$, see Fig. 3, are placed against a bracket or knee $k$ of any suitable material, having its edges $k'$ and $k^2$, exactly at right angles to one another, the pieces $a$ and $b$, then being brought into contact as described, and welded, and the beveled corners are filled with the surplus metal, so that no lumps are formed requiring subsequent finishing.

The bracket or knee $k$ may be rigidly or adjustably secured to a base forming part of a welding apparatus, the same forming no part of this invention.

The four pieces may be brought into proper position and the adjacent parts welded together simultaneously, or the pieces may be welded two at a time. When the welding is completed the chase is finished, the corners being square and true, as shown in Fig. 3, and requiring no subsequent tooling or machinery.

It is much easier and cheaper to finish the pieces as described, and much more rapid, for strips or bars of any length can be passed through a planer or milling machine and finished, and thereafter cut into the proper lengths.

I have shown in Fig. 1 partially by dotted lines, and in section Fig. 2, an adjustable bar $c$, by means of which the chase can be divided into two parts. As herein shown, each end of the bar $c$ is provided with a projection $c'$ and an upturned flange $c^2$, adapted to enter a recess $d$ and an L-shaped groove $d'$ respectively, in the inner edge and lower part of the side pieces, the flange acting as a lock to bind the bar $c$ to the side pieces $b, b'$. The recesses $d$ and grooves $d'$ extend to one end of each side piece, as shown in dotted lines Fig. 1, and the bar $c$ is slipped into place before the side and end pieces are welded together. The side pieces are slotted longitudinally as $d^2$, see dotted lines Fig. 1, the length of the slot being equal to the extreme adjustment of which the cross-bar $c$ is capable, said bar being held in adjusted position by threaded bolts $e$ extended through the slots $d^2$, their threaded ends entering suitably threaded recesses $e'$ in the bar $c$.

From an inspection of Fig. 2, it will be seen that the outer end of the slot is enlarged to form shoulders against which the bolt heads bear.

I do not desire to restrict myself to any particular dimensions of the chase, nor to the specific shape of the separate pieces, as the same may be slightly altered without departing from the scope and spirit of my invention.

I claim—

The herein described method of making printers' chases, which consists in first truing the inner edge and top and bottom faces of a series of separate metallic strips or bars and squaring the ends thereof, assembling the said strips or bars with the squared end of one beveled at its upright corners and butted against the trued inner edge of and at right angles to the adjacent bar at or near its end, and thereafter welding the butted ends together, substantially as described.

In testimony whereof I have signed my name to this specification in the presence of two subscribing witnesses.

ORSILLUS W. SLOCUM.

Witnesses:
THOMAS O. FALVEY,
THOS. J. COBB.